(12) United States Patent
Foster, Jr. et al.

(10) Patent No.: US 11,966,909 B2
(45) Date of Patent: Apr. 23, 2024

(54) TEXT MESSAGING SERVICE BASED COMMERCE SYSTEM

(71) Applicant: Stodge Inc., Scottsdale, AZ (US)

(72) Inventors: Gavin Neil Foster, Jr., Richmond, VA (US); David Dennison Lacho, Squamish (CA); Brian James Swank, Lancaster, PA (US); Vishak Swaminathan Visvanathan, San Jose, CA (US); Adam Sandstrom Turner, Carbondale, CO (US); Colin Douglas Turner, Scottsdale, AZ (US); Alex Elias Beller, Denver, CO (US)

(73) Assignee: Stodge Inc., Scottsdale, AZ (US)

( * ) Notice: Subject to any disclaimer, the term of this patent is extended or adjusted under 35 U.S.C. 154(b) by 79 days.

(21) Appl. No.: 17/552,615

(22) Filed: Dec. 16, 2021

(65) Prior Publication Data

US 2022/0198431 A1    Jun. 23, 2022

Related U.S. Application Data

(60) Provisional application No. 63/129,450, filed on Dec. 22, 2020.

(51) Int. Cl.
*G06Q 30/00* (2023.01)
*G06Q 10/083* (2023.01)
(Continued)

(52) U.S. Cl.
CPC ..... *G06Q 20/3255* (2013.01); *G06Q 10/0838* (2013.01); *G06Q 10/087* (2013.01);
(Continued)

(58) Field of Classification Search
CPC .................................. G06Q 30/06–08
See application file for complete search history.

(56) References Cited

U.S. PATENT DOCUMENTS 11,170,380 B1    11/2021  Long et al.
11,416,887 B1    8/2022   Long et al.
(Continued)

FOREIGN PATENT DOCUMENTS

WO    WO 2008/046613 A1    4/2008

OTHER PUBLICATIONS

PCT International Search Report and Written Opinion, PCT Application No. PCT/US2021/63699, dated Mar. 7, 2022, 12 pages.
(Continued)

*Primary Examiner* — Ethan D Civan
(74) *Attorney, Agent, or Firm* — Fenwick & West LLP

(57) ABSTRACT

A computing device provides enhancement of the capabilities of text messaging applications that execute on user devices. The computing device includes a processor that receives a text message via a network from a user device, the text message including a character representation of a product bundle of a merchant. The processor determines bundle data for the product bundle by referencing a database using the character representation. The processor provides one or more text messages via the network to the user device with transaction data including the bundle data, payment data, and shipping data. The processor receives a text message via the network from the user device confirming the transaction data. The user may use text commands presented by the computing device or natural language conversation in the text messages to the computing device to modify the transaction data and perform other ecommerce actions.

29 Claims, 9 Drawing Sheets

(51) Int. Cl.
*G06Q 10/087* (2023.01)
*G06Q 20/32* (2012.01)
*G06Q 30/0202* (2023.01)
*G06Q 30/0601* (2023.01)
*H04W 4/14* (2009.01)

(52) U.S. Cl.
CPC ....... *G06Q 20/322* (2013.01); *G06Q 30/0202* (2013.01); *G06Q 30/0631* (2013.01); *G06Q 30/0633* (2013.01); *H04W 4/14* (2013.01)

(56) References Cited

U.S. PATENT DOCUMENTS

| | | |
|---|---|---|
| 11,416,897 B1 | 8/2022 | Long et al. |
| 2013/0115925 A1* | 5/2013 | Macrae ................ G06F 16/951 |
| | | 455/414.1 |
| 2017/0262837 A1 | 9/2017 | Gosalia |
| 2022/0383400 A1* | 12/2022 | Wade ................ G06Q 30/0623 |
| 2023/0162258 A1* | 5/2023 | Das Gupta ......... G06Q 30/0633 |
| | | 705/26.7 |

OTHER PUBLICATIONS

Provisional U.S. Appl. No. 62/511,413, filed May 26, 2017, 13 pages.

* cited by examiner

400

```
Receive a character representation of a product bundle of a merchant via a
text message from a user device associated with a user
402
```
↓
```
Determine bundle data associated with the character representation
404
```
↓
```
Determine payment data and shipping data associated with user device
406
```
↓
```
Provide one or more text messages indicating transaction data including the
bundle data, the payment data, and the shipping data to the user device
408
```
↓
```
Receive a text message from the user device confirming the transaction data
410
```
↓
```
Send the transaction data to a merchant device associated with the merchant
412
```

FIG. 4

TEXT MESSAGING SERVICE BASED COMMERCE SYSTEM

CROSS REFERENCE TO RELATED APPLICATIONS

This application claims the benefit of U.S. Provisional Application No. 63/129,450, filed Dec. 22, 2020 entitled "Text Messaging Service Based Commerce System," which is incorporated by reference in its entirety.

TECHNICAL FIELD

The present disclosure relates to text messaging systems, and more particularly, to enable enhanced transactional capabilities through text messaging.

BACKGROUND

User devices, such as smart phones, allow users to communicate using text messages. The text messages may be short messaging service (SMS) text messages, multimedia messaging services (MMS) text messages, or enhanced messaging service (EMS) text messages. These types of text messages are transmitted, at least in part, via a cellular network. In another example, text messages may be transmitted via the Internet, such as text messages of Over the Top (OTT) applications that execute on the user devices. While text messages have been used to communicate information, it is desirable to enhance the functionality of text messaging applications in view of their popularity and ubiquity on user devices.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

Figure (FIG. 1 is a block diagram of a computing system, in accordance with some embodiments.

FIG. 4 is a flowchart of a process for executing a transaction for a product bundle via text messaging, in accordance with some embodiments.

DETAILED DESCRIPTION

Figure 1:
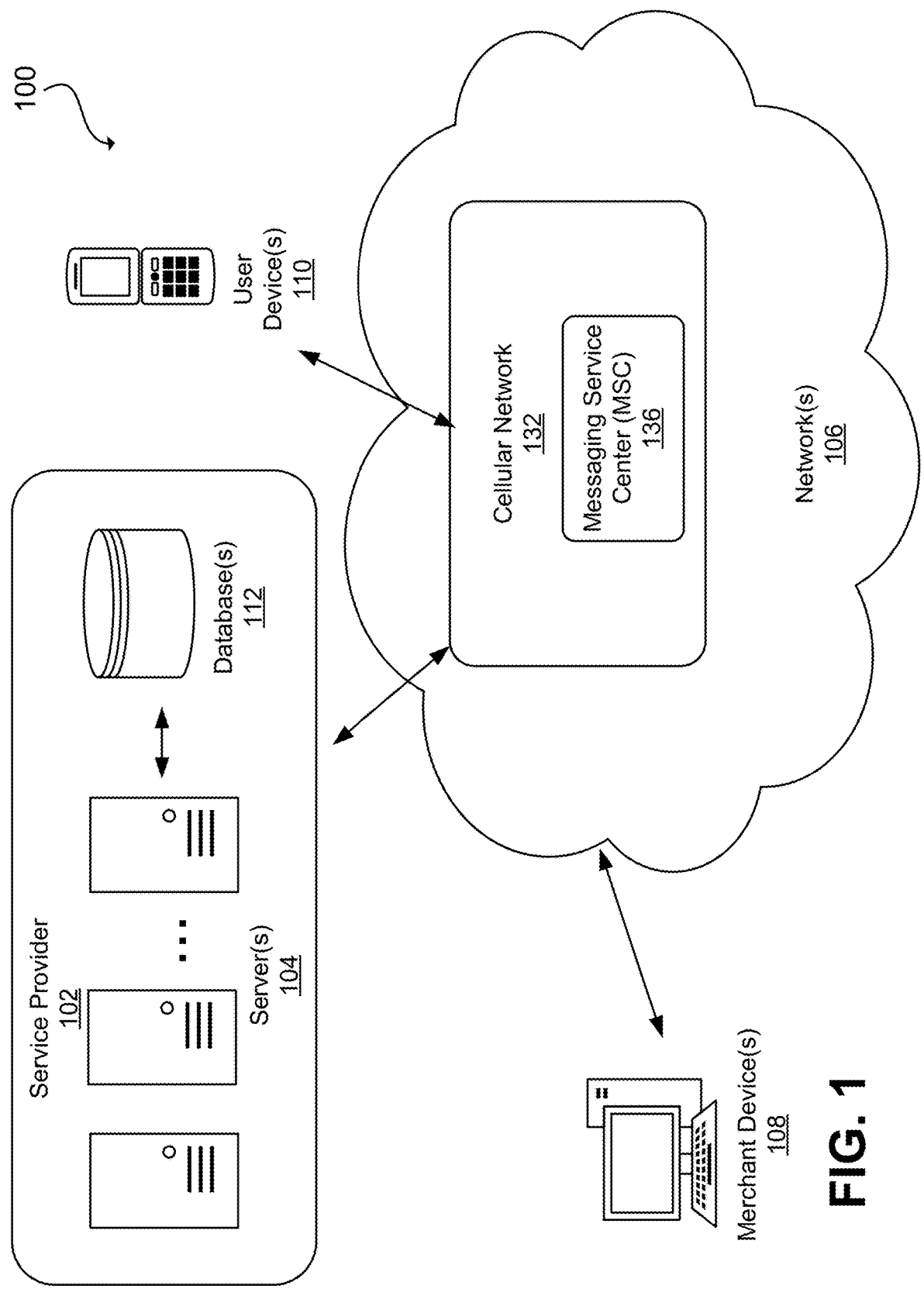

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Aspects of the present disclosure relate to enhancing the capabilities of text messaging applications that execute on user devices, such as smart phones. For example, a system provides an application interface for merchants to define product bundles that can be offered to users. Each product bundle includes one or more products, a quantity for each product, and a variant for each product (if applicable). The merchants also define character representations of the product bundles that are used to reference the product bundles in text messages between users and the system. The merchant interactions in this context may be through the application interface (e.g., a user interface) associated with a computing device. The computing device may have some or all of the components of a computer system described with FIG. 9.

Users send (which as used herein includes electronically transmit) the character representation in a text message to a phone number associated with the system. The system recognizes the product bundle from the character representation. The system stores payment data, shipping data, and other user information for the user, and recognizes the user based on the phone number of the user device of the user. The system sends a confirmation text message to the user with the product bundle, shipping data, and payment, and executes the transaction in response to a user confirmation via text message.

The user may use predefined text commands presented by the system to the user or natural language conversation with the system to perform various actions. The system determines based on the text messages of the user the likely actions of the user and presents corresponding text commands for performing these actions to the user via text messages. Some examples of such actions include modifying a product bundle, modifying user data such as shipping data or payment data, or viewing additional information about products or product bundles. The user interactions may be through a user interface for a text messaging service and associated with a computing device that is connected with a network. The computing device may have some or all of the components of the computing device described with FIG. 9. In addition, the computing device associated with merchant and the computing device associated with the user may be within a computing system environment, for example, as described with FIG. 1.

Example System Environment

Figure (FIG. 1 is a block diagram of a computing system environment 100, in accordance with an example embodiment. The computing system 100 may include a service provider 102 connected to user device(s) 110 and merchant device(s) 108 via a network 106. The service provider 102 includes one or more server computers (or server or servers)

104 and one or more databases (which may be hosted on database server computer systems) 112. The server 104 provides a service that allows users of user devices 110 to request, modify, and complete transactions for products offered by merchants using text messaging applications executing on the user devices 110. By way of example, users also may be referred to as consumers. The computing system and/or user devices may have some or all of the components of the computer system described with FIG. 9.

The server 104 provides (or enables for display) one or more user interfaces to the merchant devices 108 for defining product bundles. The merchant devices 108 are associated with merchants that sell products to the users. Each product bundle includes one or more products, a quantity of each product, and a variant (if applicable) for each product.

The server 104 communicates with user devices 110 via text messages. The text messages may be short message service (SMS), multimedia message service (MMS), or enhanced messaging service (EMS) text messages. These types of text messages are transmitted, at least in part, via a cellular network. In another example, the text messages may be transmitted via the Internet, such by over the top (OTT) applications that execute on the user devices 110. The server 104 enhances the functionality of the text messaging programs on user devices 110. Via text messaging, the server 104 provides messages to user devices 110 regarding product bundles, executes transactions for the product bundles, facilitates modification of product bundles, and manages account information such as shipping data or payment data used for the transactions. These actions may be performed by the using via predefined text commands included within the text messages. During steps if a text message conversation between the user and the server 104, the server determines likely actions of the user and presents the text commands for those actions to the user. These text commands may be transmitted via text message to the user device 110 either automatically or in response to a request from the user. Additionally, or alternatively, actions may be performed by the user using natural language within the text messages. The server 104 uses natural language processing techniques to interpret user intent and executes actions accordingly.

A product bundle is referenced within the text messages between the server 104 and the user devices 110 using a character representation. The character representation may include a bundle modifier (e.g., special characters (for example #, %, @, $, /), an emoji, an emoticon, etc.) and a name string. The bundle modifier includes one or more characters (or "bundle modifier characters") that indicate occurrence of the character representation within a text message. The name string identifies the product bundle and may be adjacent to (e.g., after or before, without separation by a space character) the one or more bundle modifier characters in the character representation. In one example, a bundle modifier "#whiteshirt" has a "#" modifier character and a name string "whiteshirt." When the server 104 receives a text message from the user device 110 that includes the bundle modifier "#whiteshirt," the server uses the bundle modifier to determine the product bundle of interest to the user. Additional details regarding the server 104 is discussed below in connection with FIG. 2.

The database(s) 112 stores information used by the server(s) 104 for interactions with the merchants and users. The server 104 stores information in the database 112 and retrieves the information from the database 112. For example, the database 112 stores product data defining products offered by merchants, bundle data defining product bundles and character representations of the product bundles, text data of text messages between the server 104 and user devices 110, user data including shipping data, payment data, phone number or other user device identifier, and other types of account data.

The merchant devices 108 are associated with merchants that provide products to users (e.g., consumers) that order products through use the user devices 110. A merchant may be an individual or an entity. The merchant devices 108 provide product data to the server 104 which is used by the server to provide user interfaces for defining bundle data. The merchant devices 108 define the bundle data including product selections, product quantities, and product variants, which the commerce system 102 stores and uses to provide transactions via text messaging with the user devices 110.

The user devices 110 are associated with users and communicate with the server 104. A user device 110 may be a cellular phone or smart phone that sends and receives text messages. The user device 110 may be associated with a phone number that identifies the user device 110 and serves as an address for the user device 110 for transmission of text messages via a cellular network. The user device 110 is not limited to a phone, and may be a tablet, laptop, desktop, wearable device, mobile device, or any other type of device that sends and receives text messages.

The network 106 facilitates communication between the server 104, merchant devices 108, and user devices 110. The network 106 may include various types of networks, including the Internet. The servers 104, the user devices 110, and merchant devices 108 may connect to the network 106 in various ways, including wired and/or wireless connection. To facilitate transmission of SMS, MMS, or EMS text messages, the network 106 may include a cellular network 132. The cellular network 132 includes a messaging service center (MSC) 136 that receives text messages from sources, stores text messages, and forwards text messages to destinations. The cellular network 132 may further include base transceiver stations, base station controllers, and mobile switching centers that connect the user devices 110 to the MSC 136. The server 104 may also similarly connect to the MSC 136 via a wireless connection or may connect in other ways to the MSC 136 (e.g., via the Internet).

Example Server Configuration

Figure 2:
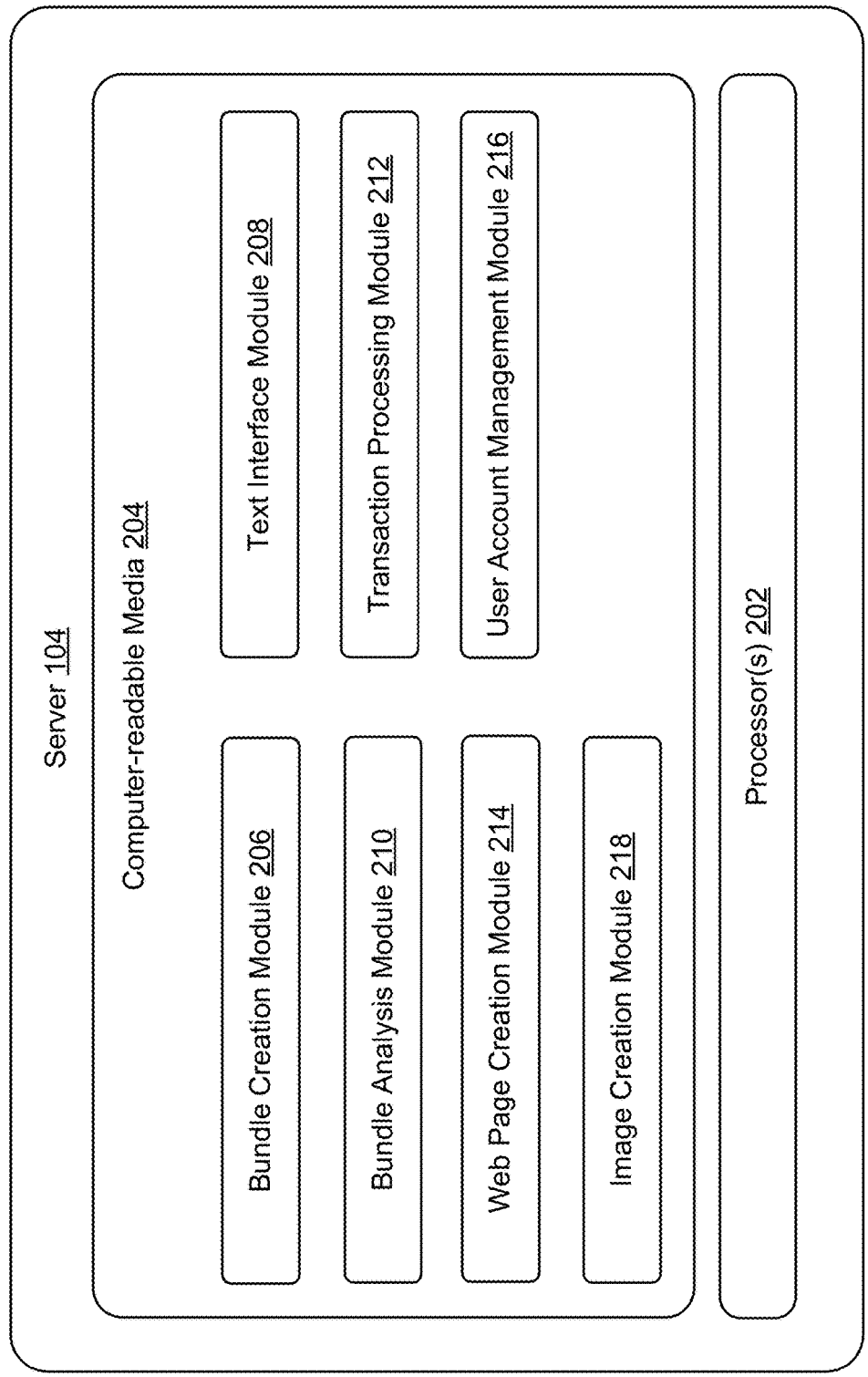
FIG. 2 is a block diagram of a server, in accordance with some embodiments.

FIG. 2 is a block diagram of a server 104, in accordance with some embodiments. The server 104 includes one or more processors 202 and computer-readable media 204. The one or more processors 202 execute program modules that cause the one or more processors 202 to perform functionality, such as facilitating transactions via text messaging. The processor(s) 202 may include one or more of a central processing unit (CPU), a graphics processing unit (GPU), a controller, a state machine, other types of processing circuitry, or one or more of these in combination. A processor 202 may further include a local memory that stores program modules, operating system data, among other things. The modules may comprise program code (or instructions) that enable specific functionality when executed by the one or more processors. The server 104 may have some or all of the components of the computer system described with FIG. 9.

The computer-readable media 204 is a non-transitory storage medium that stores the program code for a bundle creation module 206, text interface module 208, bundle analysis module 210, transaction processing module 212, web page creation module 214, user account management module 216, and image creation module 218.

The bundle creation module 206 provides a user interface to the merchant device 108 that allows merchants to create and modify product bundles. The user interface allows the merchant to create bundle data defining a product bundle and create a character representation for referencing the product bundle in text messages. The product bundle includes one or more products, a quantity associated with each of the one or more products, and if applicable, variants of the one or more products. Different types of products may include different types of variants. For example, a computer product may include variants for different hardware specifications or software packages. In another example, an apparel product may include variants for color or size. The bundle data may further include one or more prices associated with the product bundle. The bundle creation module 206 receives product data from the merchant device 108, or some other device associated with the merchant, that defines the products, variants, prices, and available quantities. Based on the product data, the user interface provided by the bundle creation module 206 allows the merchant to view (e.g., browse and search) the products, available quantities, and variants to define the bundle data of the product bundle.

The character representation of the product bundle is an identifier of the product bundle. The character representation may be unique for each product bundle of each merchant, or unique across all merchants. The character representation is defined by a string of characters that can be transmitted via text messaging. The character representation may include a bundle modifier and a name string. The bundle modifier includes one or more characters that indicate the occurrence of a character representation within a text message. The name string is a string of characters defining the name of the bundle, which may be defined by the merchant.

The bundle modifier may include one or more characters. In one example, the bundle modifier is a hashtag character ("#"). The name string for a product bundle may include "coffeebeans." As such, the full character representation of the product bundle is "#coffeebeans." In another example, the bundle modifier is a dollar sign character ("$"). The character representation is "$coffeebeans." In another example, the bundle modifier is a slash character "/." In another example, the bundle modifier includes two characters, such as "#@." The bundle modifier is not limited to the examples discussed, and could be some other character(s), symbol, emoticon, or emoji. Preferably the bundle modifier includes at least one character that is not commonly used for text message communication, and the bundle modifier is not be a single letter of the alphabet, number, punctuation mark, or other character commonly used for text message communication. Furthermore, the character representation preferably does not include a space character.

In some embodiments, the bundle modifier and/or name string of the character representation may indicate product variants, quantities, shipping type, or other parameters associated with the product bundle. For example, the character representation "#whiteshirt" may indicate a product bundle with a shirt having a white color variant while the character representation "#blueshirt" may indicate a product bundle with a shirt having a blue color variant. In another example, a character in the bundle modifier may indicate a particular shipping type, such as a faster or slower shipping option. If the modifying character is "@," then the character representation "#@whiteshirt" may indicate a product bundle with faster shipping option, while the character representation "#whiteshirt" may indicate the same product bundle except with a slower shipping option. In another example, a number in the character representation may indicate a quantity associated with the bundle. For example, the character representation "#2whiteshirt" may indicate a product bundle with two white shirts, while the character representation "#3blueshirt" may indicate a product bundle with three blue shirts. These examples illustrate technical mechanisms that maybe used with the configurations disclosed to provide expanded descriptions for product bundles given the technical limitations of text character string sizes in text messaging systems.

After the bundle data and character representation for a product bundle has been defined, the bundle creation module 204 stores the bundle data in association with the character representation in the database 112. Additional details regarding processing performed by the bundle creation module 204 are discussed below in connection with FIG. 3.

The bundle analysis module 210 programmatically determines and/or creates product bundles based on user data. For examples, each user may be associated with a user account that includes user data defining behaviors and preferences of the user. The user data may include historical purchase data, browsing data, social media data (e.g., likes, follows, group membership, etc.), prior text messages, among other things. For example, the bundle analysis module 210 may analyze a user's historical purchasing data for transactions conducted with the service provider 102 or outside of the service provider 102 to determine relevant product bundles. The bundle analysis module 210 may also analyze the language of text messages of the user to determine product bundles. The product bundles determined by the bundle analysis module 210 may be recommended to a merchant when the merchant manually creates a product bundle using the user interface provided by the bundle creation module 206, or the product bundles may be programmatically generated by the bundle analysis module 210 on behalf of the merchant. Programmatically generated product bundles may be sent to the merchant for approval or modification before being enabled for transactions.

The bundle analysis module 210 may use conversations over time via text messages involving the user of a user device 110 to programmatically determine and/or create product bundles. The bundle analysis module 210 may use natural language processing techniques to process and analyze the conversations for user intent. Examples of natural language processing techniques may include statistical methods or neural networks. These conversations may include text messages between the user and the service provider 102 (e.g., text interface module 208), the user and other users, or the user and merchants. The bundle analysis module 210 analyzes the user's text language to determine relevant products or product bundles. In addition to text messages, the bundle analysis module 210 may also collect user data in other ways. In some embodiments, user data is collected from merchant systems, such as customer support systems, email communications between merchants and users, or loyalty programs administered by merchants.

The text interface module 208 communicates with user devices 110 via text messaging to provide services on behalf of merchants. The text interface module 208 allows a text messaging application on the user device 110 to operate as a user interface for receiving messages related to product bundles on behalf of merchants, conducting transactions for product bundles, providing images and information about products of product bundles, providing modifications of the contents of product bundles, providing a display of available product bundles of a merchant for user selection, allowing users to provide shipping and payment data, among other things. The text interface module 208 receives text messages from user devices 110, processes the text messages to determine user commands and intent, generates text messages that facilitate transactions and other operations, and sends the generated text messages to the user devices 110.

The text interface module 208 enhances the functionality of the text messaging programs on user devices 110, allowing the text messaging programs to operate as a user interface for (e.g., ecommerce) actions. The text interface module 208 may perform actions based on predefined text commands and/or natural language processing. For example, a text command "B" may be input by the user and transmitted from the user device 110 to the text interface module via a text message to indicate that the user would like to modify a predefined product bundle. The text interface module 208 in response may send additional text command options via text message to the user device 110 to specify how the product bundle should be modified. Actions may additionally or alternatively be specified using natural language in text messages. For example, a text string "please change the shirt to red color" is received from a user device 110 via a text message regarding a product bundle that includes a shirt having a blue color variant. The text interface module 208 analyses the text string, as well as other text strings of the conversation, to determine the user's intent, and modifies the product bundle by replacing the blue color variant with the red color variant. 44The analysis of the user's intent may be based on the text of the current conversation as well as other user data. For example, prior conversations, order history, user preferences, user profile, etc. may be used in connection with the text of the current conversation to determine the user's intent. In some embodiments, the text of the conversation and other information about the user may be provided as inputs to a machine learning model that determines the user's intent. Additional details regarding processing performed by the text interface module 208 are discussed below in connection with FIGS. 4 through 8.

The transaction processing module 212 processes transactions for product bundles. For each transaction, the transaction processing module 212 generates transaction data including the bundle data, payment data and shipping data, and sends the transaction data to a merchant device 108 of a merchant. In another example, the transaction processing module 212 sends a payment amount and payment data of the user to a payment processing system on behalf of the merchant.

The user account management module 216 manages user data of users. For example, the user account management module 216 creates and modifies a user profile for each user and associates user data with the user profile. The user data may include an account identifier, biographical information (e.g., name, age, gender, etc.), a phone number associated with the user device 110 of the user, payment data of the user, shipping data of the user, purchase histories, prior text messages, among other things. The user data of a user may be defined or modified via text messages. For example, the text interface module 208 may provide text commands to the user that allows the user to modify the user data using text messages, and provides the modified user data to the user account management module 216. The user data may be stored in the one or more databases 112 and retrieved from the one or more databases 112 for subsequent use.

The web page creation module 214 creates a web page or web page content that contains information regarding a product bundle (or modified product bundle) and associates the web page with a location for accessing the web page (e.g., a Uniform Resource Locator (URL)). When a user provides a predefined text command (e.g., "details" or "webpage") for requesting additional information regarding a product bundle via text message or otherwise requests additional information regarding the product bundle via text message (e.g., using natural language), the text interface module 208 provides a link to a web page regarding the product bundle generated by the web page creation module 214. The web page may include images and descriptions regarding the products, quantities, and/or variants of the product bundle.

The web page creation module 214 may dynamically generate and/or modify a web page based on modifications of the product bundle made the user. Based on a text command or natural language within a text message, the text interface module 208 determines that the user would like to view a variant of a product and instructs the web page creation module 214 to generate a web page showing an image of the variant. The text interface module 208 then provides a reference to the web page to the user device 110.

The image creation module 218 generates images of product bundles, including modified product bundles. The images may be placed in the web pages created the web page creation module 214, sent to user devices 110 via text message by the text interface module 208, or otherwise provided to users. The image creation module 218 may algorithmically create an original product image based on the contents of a product bundle. The image creation module 218 may combine product images of different products in the product bundle into a single image. The image creation module 218 may automatically attach an image when a product bundle is included in a text message sent by the text interface module 208, or otherwise suggest or provide the image to the text interface module 208. In some embodiments, the image creation module 218 adds text to an image.

Example Operational Configurations

Figure 3:
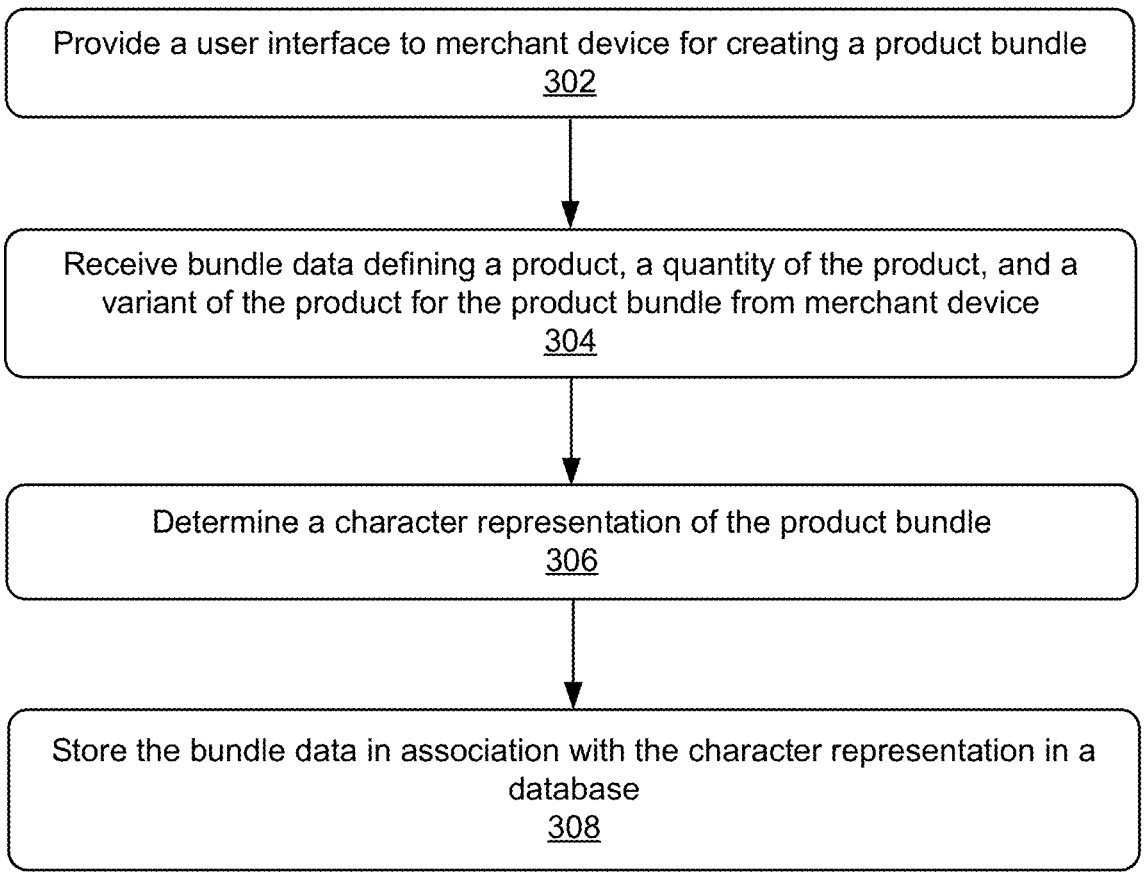
FIG. 3 is a flowchart of a process for creating a product bundle, in accordance with some embodiments.

FIG. 3 is a flowchart of an example process 300 for creating a product bundle, in accordance with some embodiments. The process 300 is described as being performed by the computing devices of FIGS. 1 and 2 but may also be performed in other types of computing devices. The process 300 may include fewer or additional steps, and the steps may be performed in different orders.

The server 104 provides 302 program code that may be used to render a user interface to a merchant device 108 for creating a product bundle. The server 104 may determine product bundle recommendations based on the historical product bundle purchase data from the merchant or other merchants and provide the product bundle recommendations to the user interface.

The server 104 receives 304 bundle data defining a product, a quantity of the product, and a variant of the product for the product bundle from the merchant device 108. The bundle data may be defined using the user interface provided by the server 104 to the merchant device 108. The product bundle may include one or more products. Each product may have a corresponding quantity and a variant.

The server 104 determines 306 a character representation of the product bundle. The character representation includes one or more bundle modifier characters that is used to indicate occurrence of the character representation within text messages. The character representation further includes a name string that identifies the product bundle. The name string may be adjacent to the one or more bundle modifier characters in the character representation. The name string may be defined by the merchant using the user interface provided by the server 104.

The server 104 stores 308 the bundle data in association with the character representation in a database (e.g., database 112). When the character representation is located within a text message from a user, the bundle data may be determined by referencing the database using the character representation.

FIG. 4 is a flowchart of an example process for executing a transaction for a product bundle via text messaging, in accordance with some embodiments. The process 400 is described as being performed by the computing devices of FIGS. 1 and 2 but may also be performed in other types of computing devices. The process 300 may include fewer or additional steps, and the steps may be performed in different orders.

The server 104 receives 402 a character representation of a product bundle of a merchant via a text message from a user device 110 associated with a user. The text messages between the server 104 and user device 110 are transmitted via a network 106. The network 106 may include a cellular network 132 and the text messages may be SMS, MMS, or EMS text messages. The user device 110 may send the text message to a phone number associated with the service provider 102. In some embodiments, different merchants may be associated with different phone numbers, and thus the server 104 can identify a particular merchant of interest based on the destination phone number used by the user device 110 to send the text message. In this example, multiple merchants can use the same character representation for their respective product bundle without conflicts.

The character representation includes one or more bundle modifier characters indicating occurrence of the character representation within the text message. A bundle modifier character may include a "#" character, a "$" character, a "/" character, an emoji, an emoticon, or some other character. The character representation of the product bundle further includes a name string that identifies the product bundle. The name string is adjacent to the one or more bundle modifier characters in the character representation.

In some embodiments, the user sends a text command to request a menu of character representations for a merchant. The server 104 retrieves the product bundles of the merchant and sends a text message to the user with the character representations. In some embodiments, the server 104 determines a group of relevant product bundles for the user based on the user's behavior or text message content and provides character representations of the product bundles to the user device 110 via text messaging. Providing character representations to the user device 110 allows the user to send a text message in response with a character representation of interest.

The server 104 determines 404 bundle data associated with the received character representation. The server 104 references the database 112 using the character representation to retrieve the bundle data. The product bundle may include one or more products. For each product, the bundle data defines a quantity of the product and a variant of the product.

The server 104 determines 406 payment data and shipping data associated with the user. For example, the database 112 stores an association between the phone number of the user device 110 and user data of the user of the user device 110. The server 104 uses the phone number associated with the received text message to retrieve the payment data and the shipping data from the database 112.

The server 104 provides 408 one or more text messages indicating transaction data including the bundle data, the payment data, and the shipping data to the user device 110. The server 104 may send multiple text messages if the information transmitted to the user device 110 exceeds any character limitations of the text messaging program. For example, SMS text messaging uses a 160-character limit for each message. The transaction data is provided to the user device 110 for confirmation by the user. The transaction data may also include a price for the transaction, which may include the price of the product bundle, taxes, shipping fees, etc. The server 104 may provide via text message a list of text commands for confirming the transaction data or modifying the various types of transaction data, such as the bundle data, the payment data, the shipping data. For example, a text command "C" may be used to confirm the transaction data and a text command "B" may be used to modify the product bundle. In another example, the user uses natural language text input to confirm or modify the transaction data, which is programmatically interpreted by the server 104 and executed accordingly. If any of the transaction data is modified, the server 104 may send a confirmation indicating the modified transaction data via text message to the user device 110. The server 104 may also send an image of the product bundle or a link to a web page about the product bundle to the user device 110 via text message.

The server 104 receives 410 a text message from the user device 110 indicating confirmation of the transaction data. The confirmation may include a text command for confirming the transaction or a natural language confirmation. In response to receiving the confirmation from the user device 110, the server 104 send (or as noted earlier, electronically transmits) 412 at least a portion of the transaction data to a merchant device 108 associated with the merchant.

In some embodiments, the user confirmation step may be optional. For example, because the user can be pre-registered and have an immutable identifier in the database 112 (e.g., the phone number of the text message), the server 104 can execute the transaction in response to receiving the text message including the character representation of the product bundle, without requiring user confirmation. In one example, the character representation in the text message may include a modifier character that indicates the confirmation by the user is not needed. As such, the actions by the user and the number of text messages needed to execute a transaction can be reduced.

Example Interface and Interactions

Figure 5:
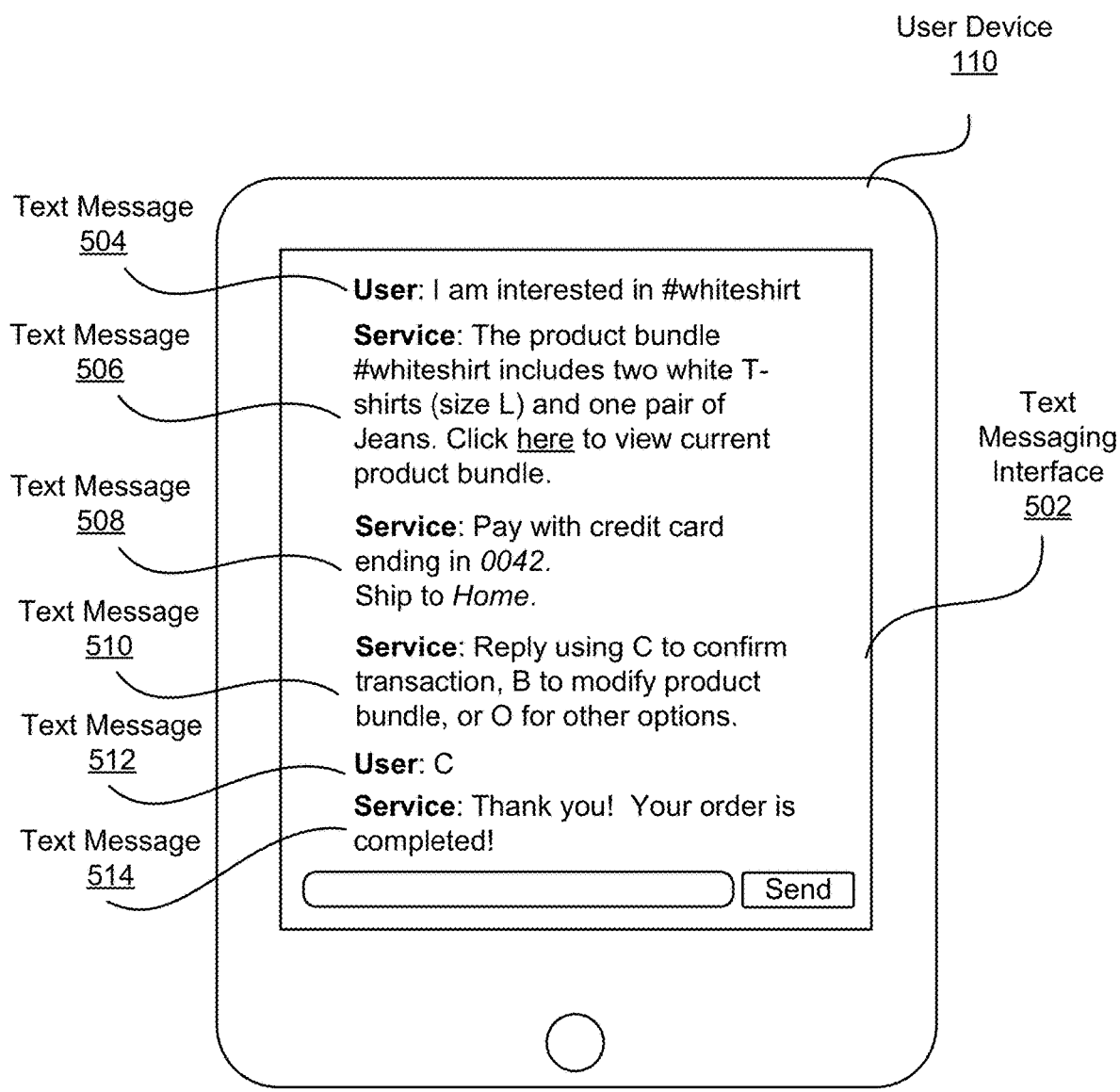
FIG. 5 is a user device displaying text messages for executing a transaction, in accordance with some embodiments.

FIG. 5 is a user device 110 displaying an example interface with text messages for executing an example transaction, in accordance with some embodiments. The user device 110 executes a text messaging application that provides a text messaging interface 502 for the user (shown as "User") to send and receive text messages with the server 104 (shown as "Service"). The user sends a text message 504 including "I am interested in a #whiteshirt" to the server 104, where "#whiteshirt" is a character representation of a product bundle. The server 104 determines transaction data including the product bundle, payment data, and shipping data and sends the transaction data to the user device 110 via text messages 506 and 508. The server 104 also sends a text message 510 that includes text commands for likely actions of the user. The text commands include "C" to confirm the transaction, "B" to modify the product bundle, or "O" for other options. Examples of other options may include changing the payment data or shipping data. The user sends a text message 512 to the server 104 that includes the text command "C" to confirm the transaction. The server sends a text message 514 to indicate that the transaction has been completed.

Figure 6:
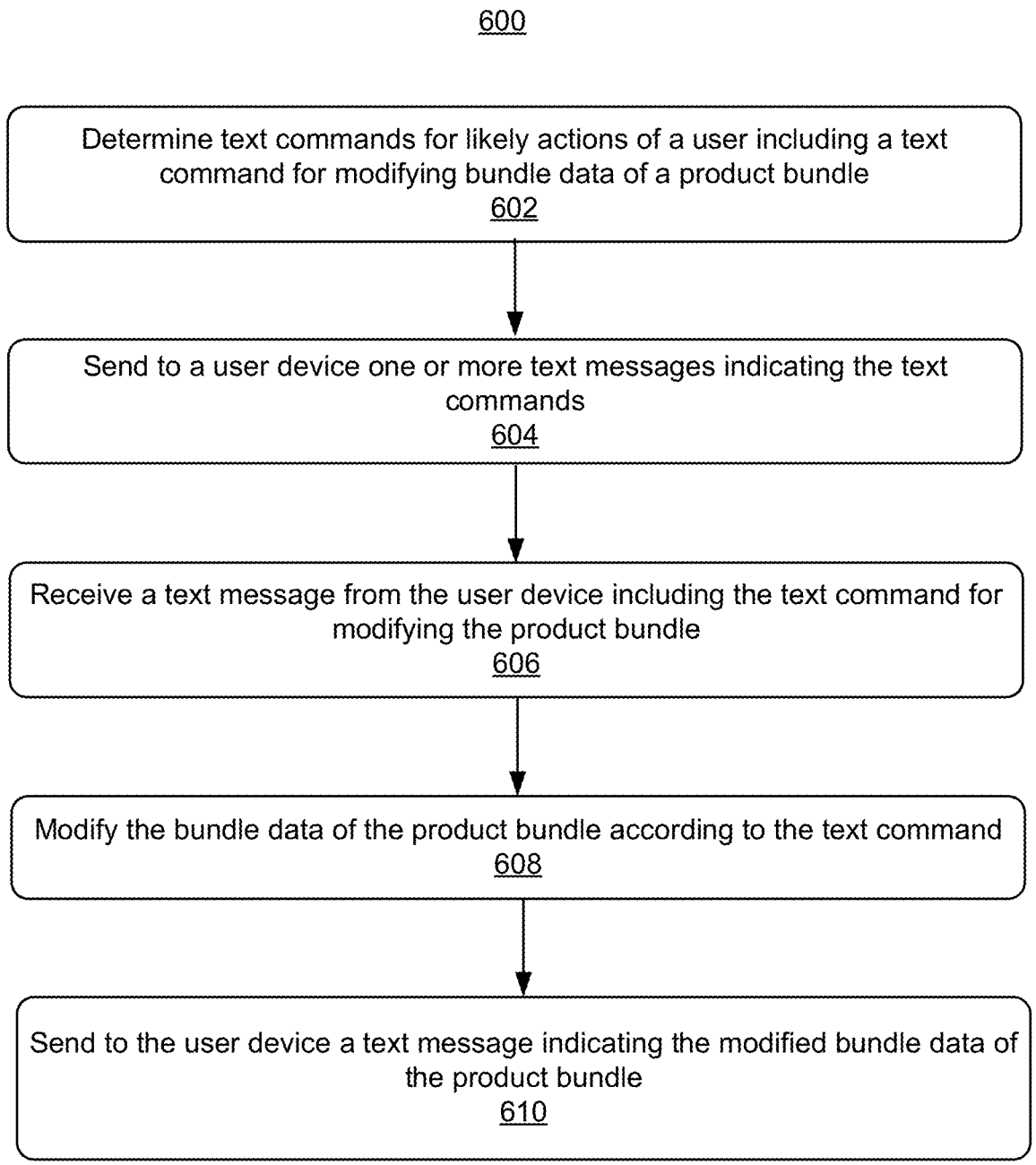
FIG. 6 is a flowchart of a process for modifying a product bundle via text messaging, in accordance with some embodiments.

FIG. 6 is a flowchart of an example process for modifying a bundle via text messaging, in accordance with some embodiments. The process 600 is described as being performed by the computing devices introduced with FIGS. 1 and 2 but may also be performed in other types of computing devices. The process 600 may include fewer or additional steps, and the steps may be performed in different orders.

The server 104 (e.g., text interface module 208) determines text commands for likely actions of a user. At each stage of a text message conversation between the server 104 and a user on a user device 110, the server 104 may determine the likely actions of the user based on the text messages from the user. The likely actions may be determined based on user intent, the stage of the transaction process, the context of the conversation, questions sent by the user, etc. The server 104 determines text commands for each of the likely actions.

The text commands may include one or more text commands for modifying bundle data of a product bundle. For example, a text command may be used to modify the product, the quantity of the product, or the variant of the product in a product bundle. Modifications of a product bundle may also include replacing a product with another product, which may also be initiated with a text command. The text command may also include text commands for modifying user data, such as shipping data, payment data, biographical information, etc.

In some embodiments, the user sends a text command to request a menu of available actions that can be performed with respect to a particular merchant. Some examples of these actions may include submitting a support ticket, modifying an order, managing a subscription, initiating a transaction, etc. Each available action may include a corresponding text command that the server 104 provides to the user via text message.

The server 104 sends 604 to a user device 110 one or more text messages indicating the text commands. The one or more text messages provide a menu of text commands for the user to execute actions via text messaging with the server 104.

The server 140 receives 606 a text message from the user device including the text command for modifying the product bundle. The text command indicates that the product bundle should be modified and may be accompanied with text from the user that indicates how the product bundle should be modified. In one example, upon receiving a text command that indicates user intent to modify the product bundle, the server 104 sends additional text commands providing modification options. In another example, the server 104 sends a question to the user asking how the product bundle should be modified, and the user responds with a natural language answer.

The server 104 modifies 608 the bundle data of the product bundle according to the text command. The modified product bundle may be stored in the database 112 in connection with a user account of the user.

The server 104 sends 610 to the user device 110 a text message indicating the modified bundle data of the product bundle. The server 104 may also send an image of the modified product bundle or a link to a web page about the modified product bundle to the user device 110 via text message.

Figure 7:
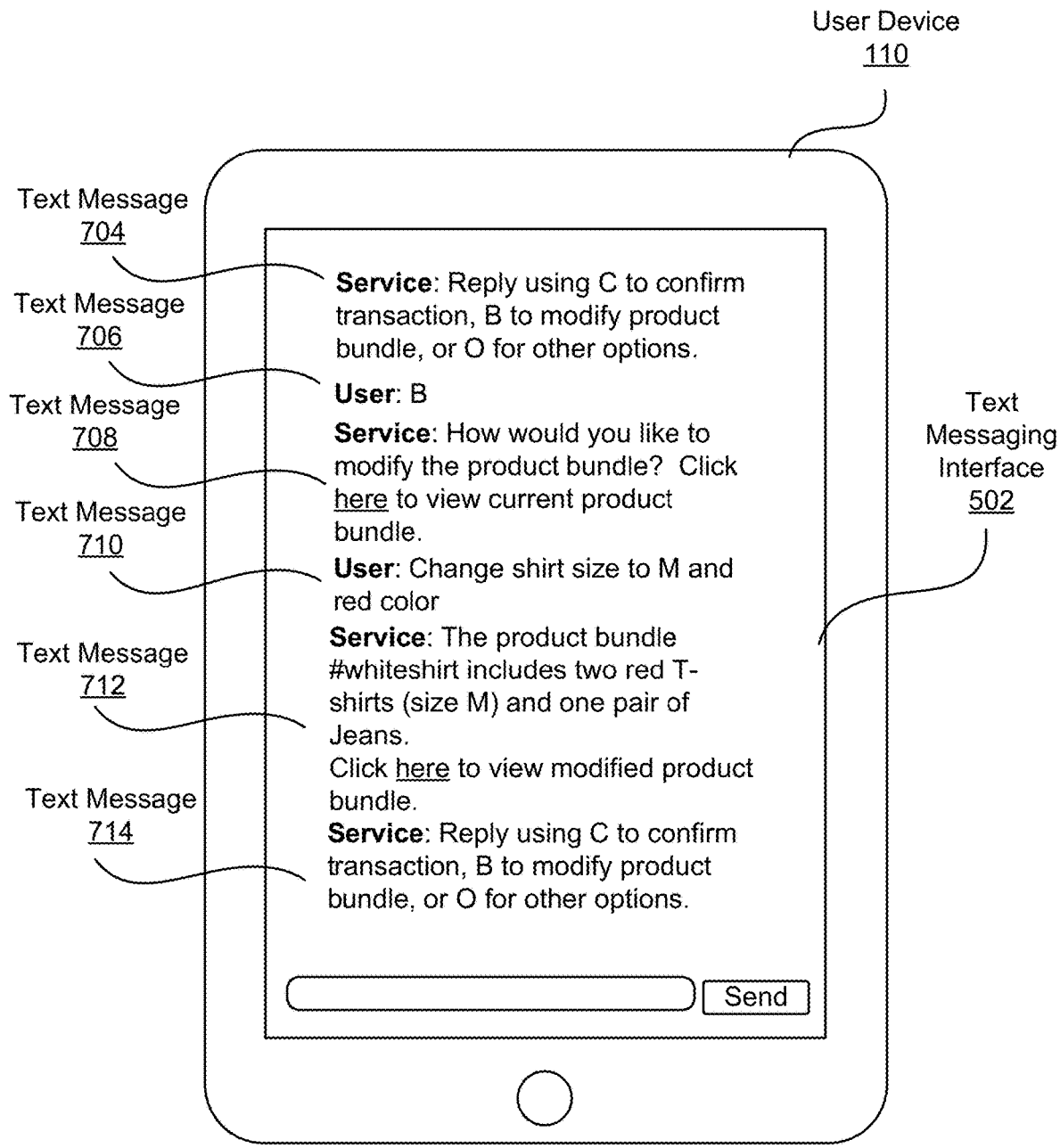
FIG. 7 is a user device displaying text messages for modifying a product bundle, in accordance with some embodiments.

FIG. 7 is a user device 110 with an example interface displaying text messages for modifying a product bundle, in accordance with some embodiments. The server 104 sends a text message 704 with text commands including "C" to confirm a transaction, "B" to modify a product bundle, or "O" for other options. The user sends a text message 706 to the server 104 that includes the text command "B" for modifying the product bundle. The server 104 sends a text message 708 asking how the user would like to modify the product bundle. In this example, the server 104 requests a natural language response from the user for additional information regarding how the product bundle should be modified. The text message 708 includes a link to a web page. The web page may show an image of the product bundle and additional information about the product bundle. The server 104 may provide the image of the product bundle directly via text message if supported by the text messaging application (e.g., using MMS text). The additional information may include the different variants that are possible for each product in the product bundle. The user sends a text message 710 with a natural language response stating to change the shirt size to M and the color to red. The server 104 sends a text message 712 with modified product bundle data to confirm the modification. The text message 712 includes a link to a web page that shows an image of the modified product bundle and additional information about the modified product bundle. The server 104 may provide the image of the modified product bundle directly via text message if supported by the text messaging application. The server 104 sends a text message 714 with the text commands to confirm the transaction, modify the product bundle, or other options. The server 104 determines that the user has just modified the product bundle, determines the likely user actions for this stage of the conversation and associated text commands, and sends the text commands to the user device 110.

Figure 8:
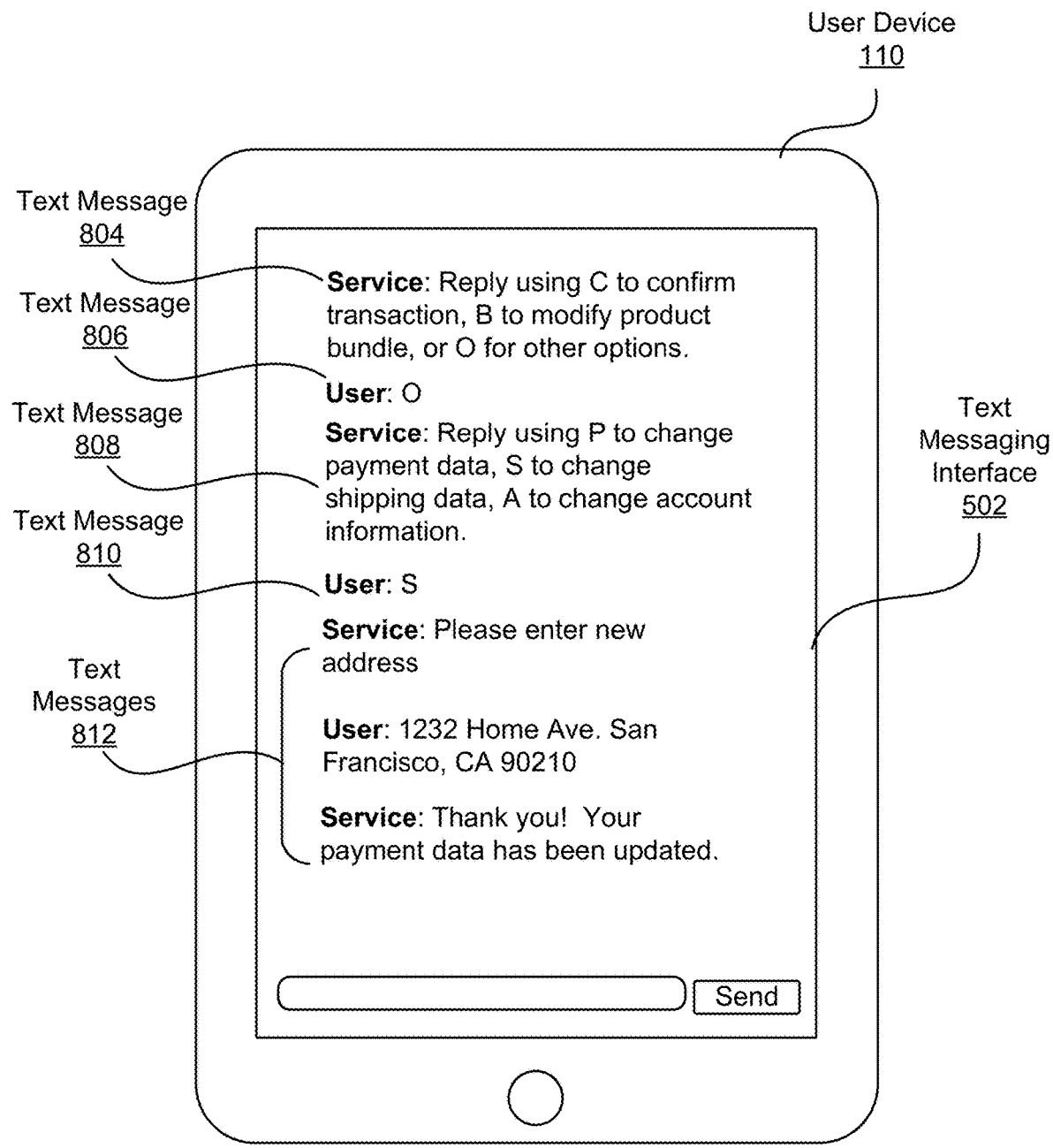
FIG. 8 is a user device displaying text messages for modifying user data, in accordance with some embodiments.

FIG. 8 is a user device 110 with an example interface displaying text messages for modifying user data, in accordance with some embodiments. The server 104 sends a text message 804 with text commands including "C" to confirm a transaction, "B" to modify a product bundle, or "O" for other options. The user sends a text message 806 to the server 104 that includes the text command "O" for other options. The server 104 sends a text message 808 with additional text commands for other options including "P" to change payment data, "S" to change shipping data, "A" to change account information (e.g., login, password, biographical information, etc.). In this example, the server 104 uses text messages to provide a menu and sub-menu of text commands for likely actions of the user. The user sends a text message 810 with the text command "S" to change shipping data. In text messages 812, the server prompts the user for the shipping data, receives the shipping data from the user, and sends a confirmation message indicating that the shipping data has been updated. Payment data may be similarly update, except that to improve security the server may send via text message a link to a secure web page for the user to submit or edit the payment data.

Example Computing Configuration

Figure 9:
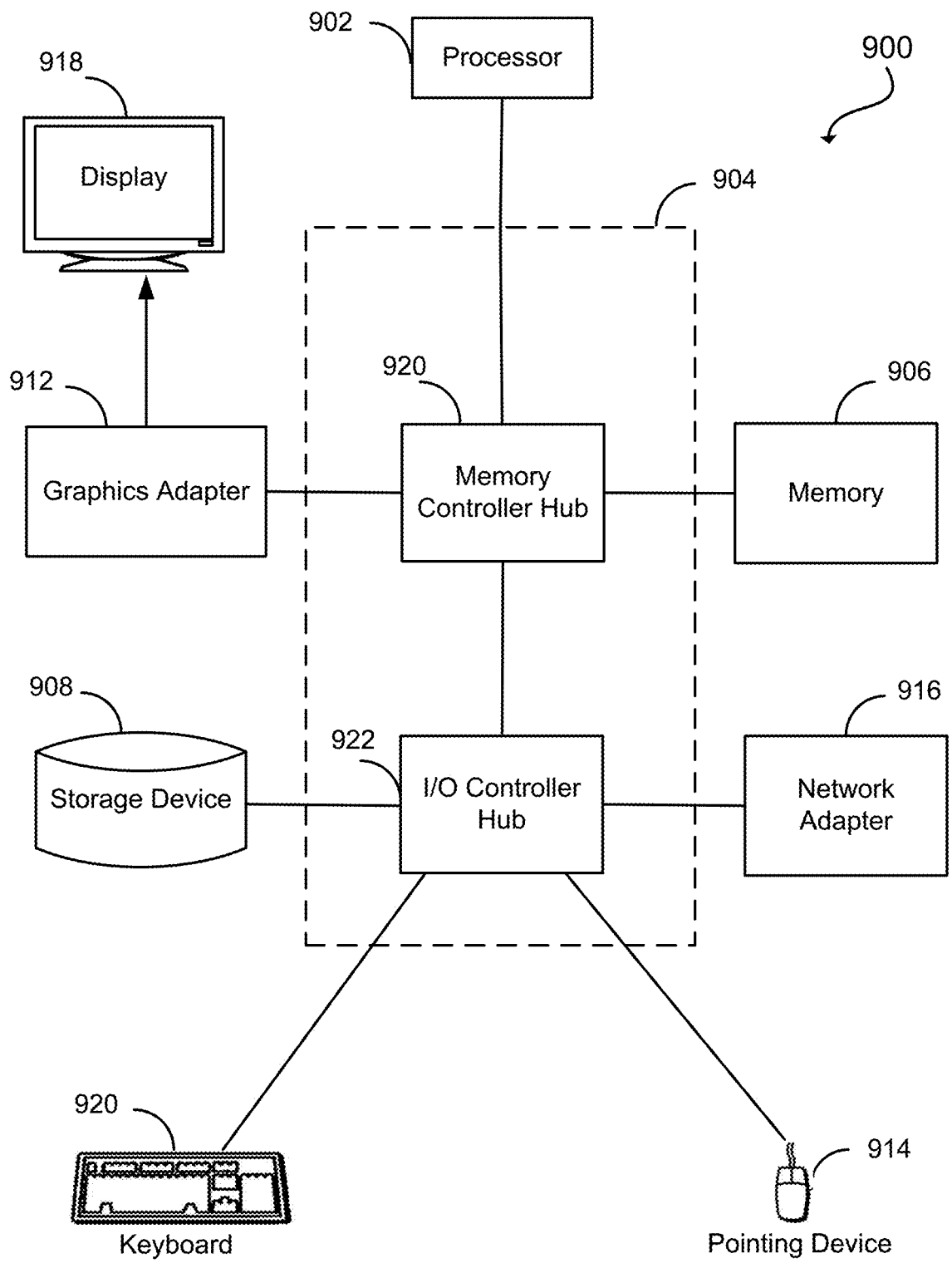
FIG. 9 is a block diagram of a computer, in accordance with some embodiments.

FIG. 9 is a block diagram of a computer system (or computer) 900. The computer 900 is an example of computing device with circuitry that implements one or more of the described components within the computing devices of the system 100, such as a server 104, user device 110, or merchant device 108. The one or more components of the computer 900 may be used to execute the processes described herein, for example, with FIGS. 1 through 8. Those processes may be embodied, for example, as functional modules as in FIGS. 1 and 2 and/or process flows, for example, as in FIGS. 4-8. Moreover, these may be further embodied as stored software (e.g., program code comprised of instructions) that may be stored on a non-transitory medium (e.g., storage device 9068) and may be executable on a processor (e.g., processor 902).

Continuing with FIG. 9, illustrated are at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display device 918 is coupled to the graphics adapter 912. A storage device 908, keyboard 910, pointing device 914, and network adapter 916 are coupled to the I/O controller hub 922. The computer 900 may include various types of input or output devices. Other embodiments of the computer 900 have different architectures. For example, the memory 906 is directly coupled to the processor 902 in some embodiments.

The storage device 908 includes one or more non-transitory computer-readable storage media such as a hard drive, compact disk read-only memory (CD-ROM), DVD, or a solid-state memory device. The memory 906 holds program code (comprised of one or more instructions) and data used by the processor 902. The program code may correspond to the processing aspects described with reference to FIGS. 1 through 8.

The pointing device 914 is used in combination with the keyboard 910 to input data into the computer system 900. The graphics adapter 912 displays images and other information on the display device 918. In some embodiments, the display device 918 includes a touch screen capability for receiving user input and selections. The network adapter 916 couples the computer system 900 to a network. Some embodiments of the computer 900 have different and/or other components than those shown in FIG. 9.

In some embodiments, the circuitry that implements a computing device or system may include an application-specific integrated circuit (ASIC), a field-programmable gate array (FPGA), or other types of computing circuitry.

Additional Considerations

The disclosed configurations beneficially allow promotional text messages of merchants to be directly converted into complete transactions within the text message interface on user devices. The user is not required to visit a separate web page or application, thereby reducing friction in the transaction process. Furthermore, the capabilities of text messaging applications that execute on user devices is improved without requiring modifications to the code of the text messaging application.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosed configurations. This description should be read to include one or at least one and the singular also includes the plural unless it is obvious that it is meant otherwise. Moreover, references to one or more may be covered by their singular instance (e.g., a server may be one or more servers, a processor may be one or more processors, a user interface may be one or more user interfaces, etc.).

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Upon reading this disclosure, those of skill in the art will appreciate still additional alternative structural and functional designs for a system and a process for audio enhancement using device-specific metadata through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A non-transitory computer readable storage medium comprising stored instructions, the instructions when executed by a processor causes the processor to:
   generate programmatically, by a bundle analysis module, a product bundle recommendation for a merchant based on historical data associated with user devices;
   receive input from the merchant approving the product bundle recommendation as a product bundle and creating a character representation for the product bundle, the character representation including: (i) a bundle modifier character indicating occurrence of the character representation within a text message; and (ii) a name string that identifies the product bundle and that is adjacent to the bundle modifier character;
   receive a first text message via a network from a user device;
   detect the occurrence of the character representation within the first text message;
   determine bundle data for the product bundle by referencing a database using the character representation, the bundle data defining at least one product, a quantity of the product, and a variant of the product;
   provide one or more second text messages via the network to the user device, the one or more second text messages including transaction data including the bundle data, payment data associated with the user device, and shipping data associated with the user device; and
   receive a third text message via the network from the user device confirming the transaction data.

2. The non-transitory computer readable storage medium of claim 1, comprising further stored instructions that when executed by the processor causes the processor to:
   receive a fourth text message via the network from the user device to modify the bundle data;
   modify the bundle data based on the fourth text message; and
   associate the modified product bundle with a user account of a user of the user device.

3. The non-transitory computer readable storage medium of claim 2, wherein the fourth text message includes a text command to modify at least one of:
   the product;
   the quantity of the product; or
   the variant of the product.

4. The non-transitory computer readable storage medium of claim 3, comprising further stored instructions that when execute by the processor causes the processor to provide, prior to receipt of the fourth text message, a fifth text message via the network to the user device indicating the text command.

5. The non-transitory computer readable storage medium of claim 1, wherein:
   the one or more second text messages indicate a text command to confirm the transaction data; and
   the third text message includes the text command.

6. The non-transitory computer readable storage medium of claim 1, comprising further stored instructions that when executed by the processor causes the processor to:
   determine one or more likely actions of a user associated with the user device;
   determine a text command for each of the likely actions; and provide one or more sixth text messages via the network to the user device indicating the text commands.

7. The non-transitory computer readable storage medium of claim 1, wherein:
the network includes a cellular network; and
the first text message, the one or more second text messages, and the third text message each are one of:
a short messaging service (SMS) text message;
a multimedia messaging service (MMS) text message; or
an enhanced messaging service (EMS) text message.

8. The non-transitory computer readable storage medium of claim 1, wherein the bundle modifier character is one of:
a "#" character;
a "$" character;
a "/" character; or
an emoji or emoticon.

9. The non-transitory computer readable storage medium of claim 1, comprising further stored instructions that when execute by the processor causes the processor to:
receive a phone number associated with the user device; and
determine the payment data and the shipping data using the phone number.

10. The non-transitory computer readable storage medium of claim 1, comprising further stored instructions that when executed by the processor causes the processor to provide the transaction data to a merchant device associated with the merchant responsive to receipt of the third text message from the user device confirming the transaction data.

11. The non-transitory computer readable storage medium of claim 1, comprising further stored instructions that when executed by the processor causes the processor to provide a user interface to a merchant device associated with the merchant to generate another product bundle and a character representation of the other product bundle.

12. The non-transitory computer readable storage medium of claim 11, comprising further stored instructions that when executed by the processor causes the processor to:
determine additional product bundle recommendations based on the other product bundle generated by the merchant; and
provide the additional product bundle recommendations to the user interface.

13. The non-transitory computer readable storage medium of claim 1, wherein the product bundle recommendation is generated programmatically based on text message conversations over time involving the user devices associated with the merchant.

14. The non-transitory computer readable storage medium of claim 13, comprising further stored instructions that when executed by the processor causes the processor to:
analyze the text message conversations for user intent, wherein the product bundle recommendation is based on the user intent.

15. The non-transitory computer readable storage medium of claim 1, wherein the product bundle recommendation is generated programmatically based on historical purchasing data for transactions conducted by the user device with the merchant.

16. The non-transitory computer readable storage medium of claim 1, comprising further stored instructions that when executed by the processor causes the processor to:
algorithmically create, by an image creation module, an original product image based on contents of the product bundle and based on product images of different products in the product bundle; and
place the original product image representing the product bundle in a web page dynamically generated by a web page creation module based on the received first text message;
wherein the one or more second text messages provided to the user device include a reference to the web page.

17. A method executable by one or more computing devices, the method comprising:
generating programmatically, by a bundle analysis module, a product bundle recommendation for a merchant based on historical data associated with user devices;
receiving input from the merchant approving the product bundle recommendation as a product bundle and creating a character representation for the product bundle, the character representation including: (i) a bundle modifier character indicating occurrence of the character representation within a text message; and (ii) a name string that identifies the product bundle and that is adjacent to the bundle modifier character;
receiving a first text message via a network from a user device;
detecting the occurrence of the character representation within the first text message;
determining bundle data for the product bundle by referencing a database using the character representation, the bundle data defining at least one product, a quantity of the product, and a variant of the product;
providing one or more second text messages via the network to the user device, the one or more second text messages including transaction data including the bundle data, payment data associated with the user device, and shipping data associated with the user device; and
receiving a third text message via the network from the user device confirming the transaction data.

18. The method of claim 17, further comprising:
receiving a fourth text message via the network from the user device to modify the bundle data;
modifying the bundle data based on the fourth text message; and
associating the modified product bundle with a user account of a user of the user device.

19. The method of claim 18, wherein the fourth text message includes a text command for modifying at least one of:
the product;
the quantity of the product; or
the variant of the product.

20. The method of claim 19, further comprising, providing, prior to receiving the fourth text message, a fifth text message via the network to the user device indicating the text command.

21. The method of claim 17, wherein:
the one or more second text messages indicate a text command for confirming the transaction data; and
the third text message includes the text command.

22. The method of claim 17, further comprising:
determining one or more likely actions of a user associated with the user device;
determining a text command for each of the likely actions; and
providing one or more sixth text messages via the network to the user device indicating the text commands.

23. The method of claim 17, wherein:
the network includes a cellular network; and
the first text message, the one or more second text messages, and the third text message are each one of:
a short messaging service (SMS) text message;
a multimedia messaging service (MMS) text message; or
an enhanced messaging service (EMS) text message.

24. The method of claim 17, wherein the bundle modifier character is one of:
a "#" character;
a "$" character;
a "/" character; or
an emoji or emoticon.

25. The method of claim 17, further comprising:
receiving a phone number associated with the user device; and
determining the payment data and the shipping data using the phone number.

26. The method of claim 17, further comprising providing the transaction data to a merchant device associated with the merchant responsive to receiving the third text message from the user device confirming the transaction data.

27. The method of claim 17, further comprising providing a user interface to a merchant device associated with the merchant for creating another product bundle and a character representation of the other product bundle.

28. The method of claim 27, further comprising:
determining additional product bundle recommendations based on the other product bundle created by the merchant; and
providing the additional product bundle recommendations to the user interface.

29. A computing device, comprising:
a memory storing instructions; and
a processor, coupled with the memory and to execute the instructions, the instructions when executed cause the processor to:
generate programmatically, by a bundle analysis module, a product bundle recommendation for a merchant based on historical data associated with user devices;
receive input from the merchant approving the product bundle recommendation as a product bundle and creating a character representation for the product bundle, the character representation including: (i) a bundle modifier character indicating occurrence of the character representation within a text message; and (ii) a name string that identifies the product bundle and that is adjacent to the bundle modifier character;
receive a first text message via a network from a user device;
detect the occurrence of the character representation within the first text message;
determine bundle data for the product bundle by referencing a database using the character representation, the bundle data defining at least one product, a quantity of the product, and a variant of the product;
provide one or more second text messages via the network to the user device, the one or more second text messages including transaction data including the bundle data, payment data associated with the user device, and shipping data associated with the user device; and
receive a third text message via the network from the user device confirming the transaction data.

* * * * *